United States Patent
Chen et al.

(10) Patent No.: US 9,796,192 B2
(45) Date of Patent: Oct. 24, 2017

(54) IMAGING PLATE COATING COMPOSITE COMPOSED OF FLUOROELASTOMER AND AMINOSILANE CROSSLINKERS

(71) Applicant: XEROX CORPORATION, Norwalk, CT (US)

(72) Inventors: Lifeng Chen, Findlay, OH (US); Mandakini Kanungo, Webster, NY (US); David J. Gervasi, Pittsford, NY (US); Phillip J. Wantuck, Rochester, NY (US); Santokh Badesha, Pittsford, NY (US); Akshat Sharma, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/279,092

(22) Filed: Sep. 28, 2016

(65) Prior Publication Data

US 2017/0015115 A1    Jan. 19, 2017

Related U.S. Application Data

(62) Division of application No. 14/229,350, filed on Mar. 28, 2014, now Pat. No. 9,494,884.

(51) Int. Cl.
| | | |
|---|---|---|
| B41J 11/00 | (2006.01) | |
| C09D 127/14 | (2006.01) | |
| C09D 127/22 | (2006.01) | |
| G03G 5/147 | (2006.01) | |
| B41J 2/01 | (2006.01) | |
| G03G 15/24 | (2006.01) | |
| G03G 15/20 | (2006.01) | |

(52) U.S. Cl.
CPC ......... *B41J 11/0015* (2013.01); *C09D 127/14* (2013.01); *C09D 127/22* (2013.01); *G03G 5/14726* (2013.01); *B41J 2002/012* (2013.01); *G03G 15/2057* (2013.01); *G03G 15/24* (2013.01); *G03G 2215/1676* (2013.01)

(58) Field of Classification Search
CPC combination set(s) only.
See application file for complete search history.

(56) References Cited

U.S. PATENT DOCUMENTS

| | | | |
|---|---|---|---|
| 4,339,553 A | 7/1982 | Yoshimura et al. | |
| 4,970,098 A | 11/1990 | Ayala-Esquilin et al. | |
| 4,997,642 A | 3/1991 | Curtis et al. | |
| 5,145,518 A | 9/1992 | Winnik et al. | |

(Continued)

FOREIGN PATENT DOCUMENTS

| | | | |
|---|---|---|---|
| EP | 2228690 A1 | 9/2010 | |
| JP | 62112647 A | * 5/1987 | |
| WO | WO 2005/047385 A1 | 5/2005 | |

OTHER PUBLICATIONS

Derwent Abstract of JP 62112647 A, 1990.*

(Continued)

*Primary Examiner* — Nicole M Buie-Hatcher
(74) *Attorney, Agent, or Firm* — MH2 Technology Law Group LLP

(57) ABSTRACT

Provided is a polymer coating composition for a surface layer, comprising a product of a grafting reaction between a fluoroelastomer and at least one of an aminosilane component and an aminofunctionalized fluorosilicone component.

10 Claims, 15 Drawing Sheets

(56) References Cited

U.S. PATENT DOCUMENTS

| | | |
|---|---|---|
| 5,146,087 A | 9/1992 | VanDusen |
| 5,202,265 A | 4/1993 | LaMora |
| 5,208,630 A | 5/1993 | Goodbrand et al. |
| 5,225,900 A | 7/1993 | Wright |
| 5,231,135 A | 7/1993 | Machell et al. |
| 5,256,193 A | 10/1993 | Winnik et al. |
| 5,271,764 A | 12/1993 | Winnik et al. |
| 5,275,647 A | 1/1994 | Winnik |
| 5,286,286 A | 2/1994 | Winnik et al. |
| 5,301,044 A | 4/1994 | Wright |
| 5,378,574 A | 1/1995 | Winnik et al. |
| 5,385,803 A | 1/1995 | Duff et al. |
| 5,464,703 A | 11/1995 | Ferrar et al. |
| 5,474,852 A | 12/1995 | Fitzgerald et al. |
| 5,494,702 A | 2/1996 | Blaine et al. |
| 5,539,038 A | 7/1996 | Katsen et al. |
| 5,543,177 A | 8/1996 | Morrison et al. |
| 5,547,759 A | 8/1996 | Chen et al. |
| 5,554,480 A | 9/1996 | Patel et al. |
| 5,593,807 A | 1/1997 | Sacripante et al. |
| 5,621,022 A | 4/1997 | Jaeger et al. |
| 5,629,416 A | 5/1997 | Neigel et al. |
| 5,695,878 A | 12/1997 | Badesha et al. |
| 5,700,568 A | 12/1997 | Badesha et al. |
| 5,736,520 A | 4/1998 | Bey et al. |
| 5,744,200 A | 4/1998 | Badesha et al. |
| 5,750,204 A | 5/1998 | Badesha et al. |
| 5,753,307 A | 5/1998 | Badesha et al. |
| 5,808,645 A | 9/1998 | Reeves et al. |
| 5,841,456 A | 11/1998 | Takei et al. |
| 5,945,245 A | 8/1999 | Mychajlowskij et al. |
| 6,020,300 A | 2/2000 | Tcheou et al. |
| 6,042,227 A | 3/2000 | Meinhardt et al. |
| 6,051,562 A | 4/2000 | Chamberlain et al. |
| 6,103,815 A | 8/2000 | Mammino et al. |
| 6,156,858 A | 12/2000 | Keoshkerian et al. |
| 6,221,137 B1 | 4/2001 | King et al. |
| 6,348,509 B1 | 2/2002 | Reeve |
| 6,586,100 B1 | 7/2003 | Pickering et al. |
| 7,172,276 B2 | 2/2007 | Breton et al. |
| 7,202,883 B2 | 4/2007 | Breton et al. |
| 7,281,790 B2 | 10/2007 | Mouri et al. |
| 7,294,377 B2 | 11/2007 | Gervasi et al. |
| 7,374,812 B2 | 5/2008 | Mizuno |
| 7,608,325 B2 | 10/2009 | Rasch et al. |
| 7,767,011 B2 | 8/2010 | Bedford et al. |
| 7,780,286 B2 | 8/2010 | Yahiro |
| 8,038,284 B2 | 10/2011 | Hori et al. |
| 8,136,936 B2 | 3/2012 | Hook et al. |
| 8,142,557 B2 | 3/2012 | Belelie et al. |
| 8,215,762 B2 | 7/2012 | Ageishi |
| 8,247,066 B2 | 8/2012 | Wu |
| 8,268,399 B2 | 9/2012 | Gervasi et al. |
| 8,350,879 B2 | 1/2013 | Larson et al. |
| 8,500,269 B2 | 8/2013 | Morita |
| 8,919,252 B2 | 12/2014 | Lestrange et al. |
| 9,011,594 B1 | 4/2015 | Kanungo et al. |
| 9,022,546 B1 | 5/2015 | Breton et al. |
| 9,056,958 B2 * | 6/2015 | Kanungo .................. C08J 7/04 |
| 9,126,430 B2 | 9/2015 | Liu |
| 9,138,985 B1 | 9/2015 | Yang et al. |
| 9,174,432 B2 | 11/2015 | Liu et al. |
| 9,187,587 B2 | 11/2015 | Kanungo et al. |
| 9,193,209 B2 | 11/2015 | Dooley et al. |
| 9,206,269 B2 * | 12/2015 | Kanungo .................. C08F 14/18 |
| 9,211,697 B2 | 12/2015 | Dooley et al. |
| 9,227,393 B2 | 1/2016 | Song et al. |
| 9,233,533 B2 * | 1/2016 | Kanungo .................. B41J 2/14 |
| 9,259,915 B2 | 2/2016 | Dooley et al. |
| 9,273,218 B2 | 3/2016 | Liu |
| 9,284,469 B2 | 3/2016 | Song et al. |
| 9,303,135 B2 | 4/2016 | Eliyahu et al. |
| 9,303,185 B2 | 4/2016 | Sambhy et al. |
| 9,327,519 B1 | 5/2016 | Larson et al. |
| 9,353,290 B2 | 5/2016 | Condello et al. |
| 9,365,742 B2 * | 6/2016 | Gervasi ................ C09D 171/00 |
| 9,421,758 B2 | 8/2016 | Song et al. |
| 9,458,341 B2 | 10/2016 | Song et al. |
| 9,611,404 B2 | 4/2017 | Sisler et al. |
| 2002/0064648 A1 | 5/2002 | Schlueter et al. |
| 2003/0067528 A1 | 4/2003 | Chowdry et al. |
| 2003/0233952 A1 | 12/2003 | Pan et al. |
| 2003/0233953 A1 | 12/2003 | Pan et al. |
| 2003/0234840 A1 | 12/2003 | Pan et al. |
| 2004/0158056 A1 | 8/2004 | Hiemstra et al. |
| 2004/0253436 A1 | 12/2004 | Heeks et al. |
| 2005/0018027 A1 | 1/2005 | Pan et al. |
| 2006/0008599 A1 | 1/2006 | Hiyama |
| 2006/0105117 A1 | 5/2006 | Kim et al. |
| 2006/0147659 A1 | 7/2006 | Foley |
| 2006/0152566 A1 | 7/2006 | Taniuchi et al. |
| 2007/0179291 A1 | 8/2007 | Thibodeau et al. |
| 2007/0207186 A1 | 9/2007 | Scanlon et al. |
| 2007/0207269 A1 | 9/2007 | Woodhall et al. |
| 2007/0266896 A1 | 11/2007 | Suwa et al. |
| 2008/0032072 A1 | 2/2008 | Taniuchi et al. |
| 2008/0055381 A1 | 3/2008 | Doi et al. |
| 2008/0206571 A1 | 8/2008 | Berckmans et al. |
| 2009/0110942 A1 | 4/2009 | Henderson-Rutgers et al. |
| 2009/0152664 A1 | 6/2009 | Klem et al. |
| 2009/0195579 A1 | 8/2009 | Tousi et al. |
| 2009/0237479 A1 | 9/2009 | Yamashita et al. |
| 2011/0018925 A1 | 1/2011 | Ohara |
| 2011/0025752 A1 | 2/2011 | Law et al. |
| 2011/0028620 A1 | 2/2011 | Faucher et al. |
| 2011/0122195 A1 | 5/2011 | Kovacs et al. |
| 2011/0122210 A1 | 5/2011 | Sambhy et al. |
| 2011/0269849 A1 | 11/2011 | Yao |
| 2012/0039648 A1 | 2/2012 | Sambhy et al. |
| 2012/0042518 A1 | 2/2012 | Law et al. |
| 2012/0083530 A1 | 4/2012 | Mai et al. |
| 2012/0103212 A1 | 5/2012 | Stowe et al. |
| 2012/0121827 A1 | 5/2012 | Baird et al. |
| 2012/0135650 A1 | 5/2012 | Servante et al. |
| 2012/0140009 A1 | 6/2012 | Kanasugi et al. |
| 2012/0162312 A1 | 6/2012 | Ahl et al. |
| 2012/0251685 A1 | 10/2012 | Wang-Nolan et al. |
| 2012/0274914 A1 | 11/2012 | Stowe et al. |
| 2012/0283098 A1 | 11/2012 | Zhang et al. |
| 2012/0301818 A1 | 11/2012 | Gilmartin et al. |
| 2013/0244173 A1 | 9/2013 | Qiu et al. |
| 2013/0266803 A1 | 10/2013 | Dooley et al. |
| 2013/0272763 A1 | 10/2013 | Moorlag et al. |
| 2014/0060352 A1 | 3/2014 | Gervasi et al. |
| 2014/0060357 A1 | 3/2014 | Hsieh |
| 2014/0060359 A1 | 3/2014 | Kanungo et al. |
| 2014/0060360 A1 | 3/2014 | Moorlag et al. |
| 2014/0060361 A1 | 3/2014 | Gervasi et al. |
| 2014/0060363 A1 | 3/2014 | Kelly et al. |
| 2014/0060365 A1 | 3/2014 | Gervasi et al. |
| 2014/0154377 A1 | 6/2014 | Wang-Nolan et al. |
| 2014/0168330 A1 | 6/2014 | Liu et al. |
| 2014/0307800 A1 | 10/2014 | Sole Rojals et al. |
| 2015/0004861 A1 | 1/2015 | Gervasi et al. |
| 2015/0022602 A1 | 1/2015 | Landa et al. |
| 2015/0031806 A1 | 1/2015 | Lim et al. |
| 2015/0085036 A1 | 3/2015 | Liu |
| 2015/0085039 A1 | 3/2015 | Liu |
| 2015/0116414 A1 | 4/2015 | Eliyahu et al. |
| 2015/0119510 A1 | 4/2015 | Eliyahu et al. |
| 2015/0165758 A1 | 6/2015 | Sambhy et al. |
| 2015/0258778 A1 | 9/2015 | Dooley et al. |
| 2015/0267078 A1 | 9/2015 | Dooley |
| 2015/0275022 A1 | 10/2015 | Chen et al. |
| 2015/0291847 A1 | 10/2015 | Condello et al. |
| 2015/0315403 A1 | 11/2015 | Song et al. |
| 2015/0315409 A1 | 11/2015 | Song et al. |
| 2015/0343797 A1 | 12/2015 | Song et al. |
| 2016/0083606 A1 | 3/2016 | Sisler et al. |
| 2016/0083607 A1 | 3/2016 | Sisler et al. |
| 2016/0083609 A1 | 3/2016 | Sisler et al. |
| 2016/0083636 A1 | 3/2016 | Yoshida et al. |
| 2016/0089875 A1 | 3/2016 | Song et al. |
| 2016/0176185 A1 | 6/2016 | Kanungo et al. |

(56) References Cited

U.S. PATENT DOCUMENTS

| | | |
|---|---|---|
| 2016/0237296 A1 | 8/2016 | Song et al. |
| 2016/0280949 A1 | 9/2016 | Song et al. |
| 2016/0326376 A1 | 11/2016 | Song et al. |
| 2017/0015115 A1 | 1/2017 | Chen et al. |
| 2017/0051155 A1 | 2/2017 | Larson et al. |
| 2017/0130087 A1 | 5/2017 | Sisler et al. |
| 2017/0145240 A1 | 5/2017 | Sisler et al. |

OTHER PUBLICATIONS http://mw2.dupont.com/Elvanol/en_US/assets/downloads/elvanol_51_05.pdf, 2006.

Author Unknown, Byk-Silclean 3700 by BYK Chemie, http://www.specialchem4coatings.com/tds/byk-silclean-3700/byk-chemie/10414/index.aspx?q=Byk%20Silclean%203700, 2013, 1 page.

Author Unknown, "Chemical reactions on the "finished" silicone", Silicones Europe, http://www.silicones.eu/science-research/chemistry/chemical-reactions-on-the-finished-silicone, accessed Dec. 13, 2014, pp. 1-4.

Author Unknown, Desmodur N 3790 BA, Bayer MaterialScience, LLC., http://www.bayermaterialsciencenafta.com/products/index.cfm?mode=lit&pp_num=EB7C52DD-F4EC-BDA1-6BE0225FEE5C1FD0&pg_num=EB7C5520-9065-98A0-5A4CD71113D57191&pf=0&pf=1, 2007, 1 page.

Author Unknown, "Dot Tool", Quality Engineering Associates, Inc., pp. 1-3, May 9, 2016.

Author Unknown, "Products and Properties: Desmodur/Desmophen for Coatings, Commercial Products", Bayer MaterialScience AG brochure, Edition: 2005-07 E, 28 pages.

Berset 2185, Technical Data Sheet, Mar. 14, 2012, 2 pages.

Cabot, "Specialty Carbon Blacks for Ultraviolet Protection & Weatherability", Cabot Corporation, 2 pages, Jun. 28, 2015.

"Dimer Acids", Kirk-Othmer Encyclopedia of Chemical Technology, vol. 8, 4th Ed. (1992), pp. 223-237.

DOW, DOW Surfactants, http://www.dow.com/surfactants/products/second.htm, retrieved Mar. 10, 2014, pp. 1-2.

Dow, Material Safety Data Sheet, Tergitol(TM) TMN-6 (90% AQ), The Dow Chemical Company, Feb. 12, 2003, pp. 1-15.

Dow, Product Safety Assessment, Triton CF Series Surfactants, Dec. 16, 2012, 6 pages.

Law et al., "Self Cleaning Polymers and Surfaces", TechConnect World Conference & Expo, Jun. 13-16, 2011, abstract of presentation, 1 page.

Ming-Kai Tse, "PIAS-II TM—A Hig-performance Portable tool for Print Quality Analysis Anytime, Anywhere", Quality Engineering Associates (QEA), Inc. pp. 1-4, Jun. 2007.

Philipp, et al., "Three Methods for In Situ Cross-Linking of Polyvinyl Alcohol Films for Application as Ion-Conducting Membranes in Potassium Hydroxide Electrolyte", NASA, Apr. 1979,18 pages.

Reddy et al., "Citric acid cross-linking of starch films," University of Nebraska—Lincoln, Faculty Publications—Textiles, Merchandising and Fashion Design, Paper 25, 2009, pp. 702-711.

Song, "Starch crosslinking for cellulose fiber modification and starch nanoparticle formation", https://smarttech.gatech.edu/handle/1853/39524?show=full, downloaded Jan. 22, 2015, 4 pages.

Wang, et al., "Preparation of a Crosslinking Cassava Starch Adhesive and its Application in Coating Paper", BioResources, 2013, 8 (3), pp. 3574-3589.

Wikipedia, "Dicarboxylic Acid," 7 pages printed on Aug. 19, 2015.

Wikipedia, Hydrocarbon, Downloaded Mar. 2, 2016, 8 pages.

Wikipedia, "Tetracarboxylic acids", 2 pages printed on Aug. 19, 2015, https://commons.wikipedia.org/wiki/Category:Tetracarboxylic_acids.

Wikipedia, "Tricarboxylic Acid," 2 pages printed on Aug. 19, 2015.

Larson, et al., "Sacrificial Coating and Indirect Printing Apparatus Employing Sacrificial Coating on Intermediate Transfer Member", U.S. Appl. No. 14/830,557, filed Aug. 19, 2015.

Sisler, Gorden et al., Method of Making Sacrificial Coating for an Intermediate Transfer Member of Indirect Printing Apparatus, U.S. Appl. No. 15/421,929, filed Feb. 1, 2017.

Sisler, Gordon et al. "Sacrificial Coating for Intermediate Transfer Member of an Indirect Printing Apparatus", U.S. Appl. No. 15/369,962, filed Dec. 6, 2016.

Sisler, Gordon et al. "Sacrificial Coating for Intermediate Transfer Member of an Indirect Printing Apparatus", U.S. Appl. No. 15/410,050, filed Jan. 19, 2017.

* cited by examiner

IMAGING PLATE COATING COMPOSITE COMPOSED OF FLUOROELASTOMER AND AMINOSILANE CROSSLINKERS

PRIORITY CLAIM

This application is a divisional application of and claims priority to U.S. patent application Ser. No. 14/229,350, filed on Mar. 28, 2014 (now allowed) the disclosure of which is hereby incorporated herein by reference in its entirety.

DETAILED DESCRIPTION

Field of the Disclosure

The disclosure relates to fluoropolymers for printing applications. In particular, the disclosure relates to fluoroelastomers comprising grafted fluorinated polymers suitable for forming topcoat layers in transfix blankets.

Background

In aqueous ink indirect printing, an aqueous ink is jetted on to an intermediate imaging surface, which can be in the form of a blanket. The ink is partially dried on the blanket prior to transfixing the image to a media substrate, such as a sheet of paper. To ensure excellent print quality it is desirable that the ink drops jetted onto the blanket spread and become well-coalesced prior to drying. Otherwise, the ink images appear grainy and have deletions. Lack of spreading can also cause missing or failed inkjets in the print heads to produce streaks in the ink image. Spreading of aqueous ink is facilitated by materials having a high energy surface.

However, in order to facilitate transfer of the ink image from the blanket to the media substrate after the ink is dried on the intermediate imaging surface, a blanket having a surface with a relatively low surface energy is preferred. Rather than providing the desired spreading of ink, low surface energy materials tend to promote "beading" of individual ink drops on the image receiving surface.

Thus, an optimum blanket for an indirect image transfer process must tackle both the challenges of wet image quality, including desired spreading and coalescing of the wet ink; and the image transfer of the dried ink. The first challenge —wet image quality—prefers a high surface energy blanket that causes the aqueous ink to spread and wet the surface. The second challenge—image transfer—prefers a low surface energy blanket so that the ink, once partially dried, has minimal attraction to the blanket surface and can be transferred to the media substrate.

Various approaches have been investigated to provide a solution that balances the above challenges. These approaches include blanket material selection, ink design and auxiliary fluid methods. Fluoroelastomers (FKM) materials have been investigated for their use in fuser subsystems, and for potential application as blanket materials. However, there is a need to continue developing new composite materials which can be cured at lower temperature with low extractability, are flow coatable, and offer higher or comparable in mechanical strength. Identifying and developing new composites would be considered a welcome advance in the art.

SUMMARY

In an embodiment, there is a polymer coating composition for a surface layer, comprising a product of a grafting reaction between a fluoroelastomer and at least one of an aminosilane component and an aminofunctionalized fluorosilicone component.

In another embodiment, there is a method for forming a coating. The method can include forming a graft polymer composition by grafting at least one of an aminosilane component and an aminofunctionalized fluorosilicone component with a fluoroelastomer. The method can also include crosslinking the at least one of an aminosilane component and an aminofunctionalized fluorosilicone component. The method can also include depositing a layer of the graft polymer composition on a substrate, and curing the layer to form a grafted polymer coating.

In yet another embodiment, there is a printing system. The printing system can include an imaging member. The imaging member can include a substrate and a surface layer composite disposed on the substrate. The surface layer composite can be formed from a composition that includes a product of a grafting reaction between a fluoroelastomer and at least one of an aminosilane component and an aminofunctionalized fluorosilicone component.

The polymer coating compositions of the present disclosure can provide one or more of the following advantages: lower curing temperature than conventional compositions for similar applications, low extractability and flow coatable compositions, compositions that can be cured into layers that have higher or comparable mechanical strength to conventionally prepared layers.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1A:
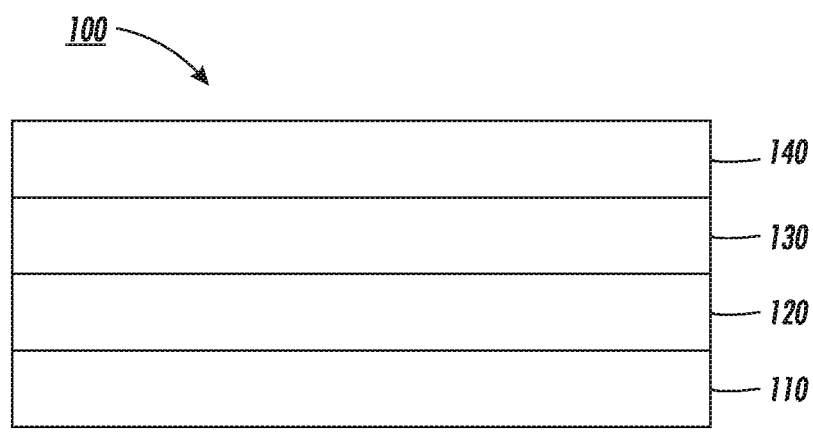
FIG. 1A depicts a cross-sectional view of an illustrative transfix blanket for a printer, according to one or more embodiments.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface.

As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

Described herein is a composition, for example, a composition for a topcoat layer of a blanket, comprising the product of a grafting reaction between a fluoroelastomer and at least one of an aminosilane component and an aminofunctionalized fluorosilicone component. In other words, there is a preliminary composition that can undergo a grafting reaction to form a product composition. The product of the grafting reaction can be a fluoroelastomer-aminosilane grafted polymer composite, wherein the aminosilane component grafted on the fluoroelastomer is a crosslinker. The product of the grafting reaction can be a fluoroelastomer-aminofunctionalized fluorosilicone grafted polymer composite, wherein the aminofunctionalized fluorosilicone component grafted on the fluoroelastomer is a crosslinker and can be crosslinked with an aminosilane crosslinker. The composition can be utilized for producing a topcoat layer of an imaging blanket for aqueous print processes, for a digital architecture for lithographic inks, and for a fuser member as described further below.

FIG. 1A depicts a schematic cross-sectional view of an illustrative transfix blanket 100 for a printer (e.g., an indirect aqueous inkjet printer), according to one or more embodiments disclosed. The blanket 100 may include a first or substrate layer 110. The substrate layer 110 may be made from or include polyimide, aluminum, woven fabric, or combinations thereof.

A second or conformance layer 120 may be disposed at least partially on and/or over the substrate layer 110. The conformance layer 120 may have a depth or thickness 122 ranging from about 500 μm to about 7000 μm, about 1000 μm to about 5000 μm, or about 2000 μm to about 4000 μm. The conformance layer 120 may be made from a composite material. More particularly, the conformance layer 120 may be made from or include a polymer matrix. The polymer matrix may be or include silicone, a crosslinked silane, or a combination thereof.

The conformance layer 120 may also include one or more filler materials such as silica, alumina, iron oxide, carbon black, or a combination thereof. The filler materials may be present in the conformance layer 120 in an amount ranging from about 0.1 wt % to about 20 wt %, about 1 wt % to about 15 wt %, or about 2 wt % to about 10 wt %.

A third or tiecoat/adhesive layer 130 may be disposed at least partially on and/or over the conformance layer 120. The adhesive layer 130 may have a depth or thickness 132 ranging from about 0.05 μm to about 10 μm, about 0.25 μm to about 5 μm, or about 0.5 μm to about 2 μm. The adhesive layer 130 may be made from a silane, an epoxy silane, an amino silane adhesive, or a combination thereof. In another embodiment, the adhesive layer 130 may be made from a composite material. More particularly, the adhesive layer 130 may be made from or include a polymer matrix. The polymer matrix may be or include silicone, a cross-linked silane, or a combination thereof.

A fourth or topcoat layer 140 may be disposed at least partially on and/or over the adhesive layer 130. The topcoat layer 140 may have a depth or thickness 142 ranging from about 500 nm to about 200 μm, about 1 μm to about 150 μm, or about 5 μm to about 100 μm.

Figure 1B:
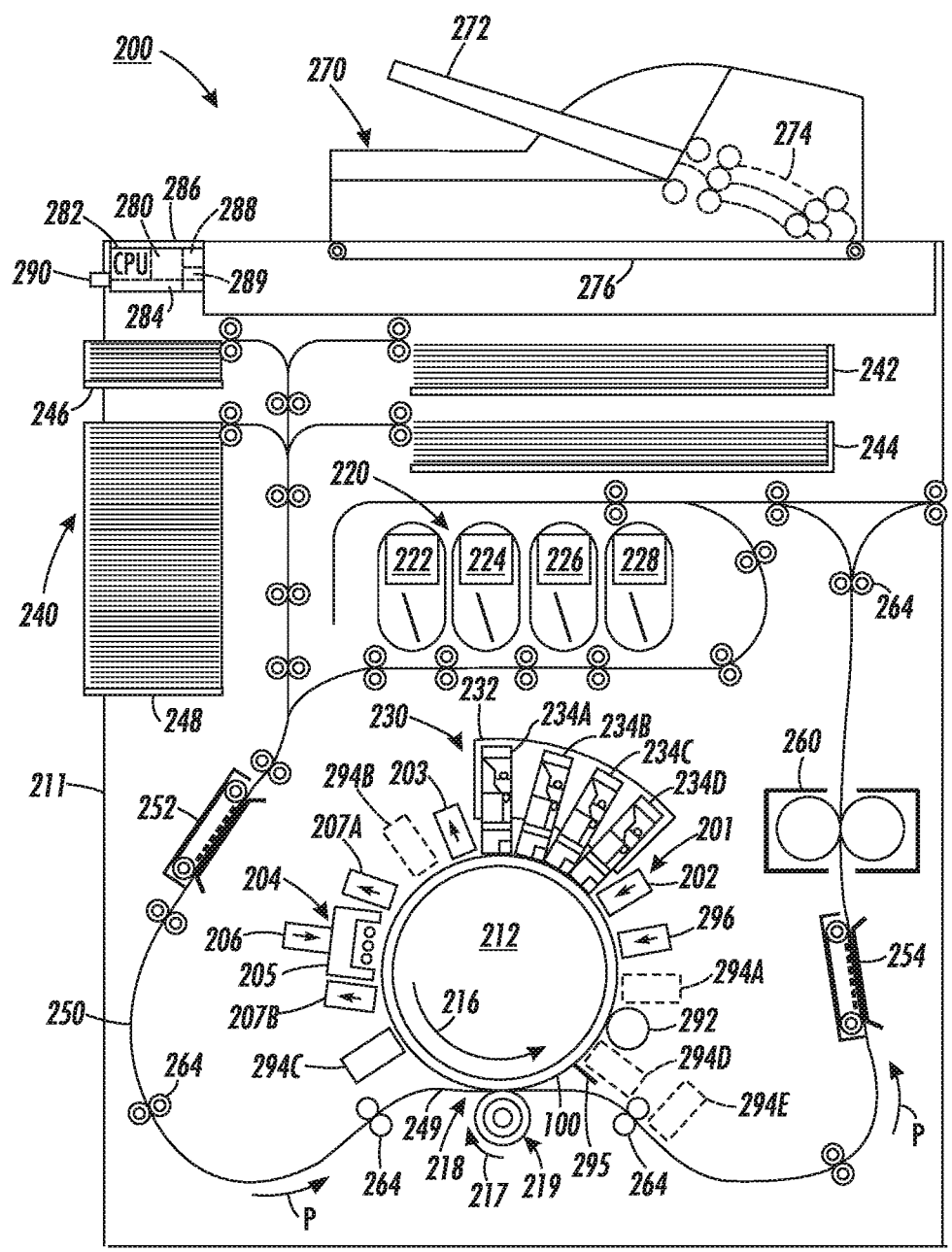
FIG. 1B is a schematic drawing of an aqueous indirect inkjet printer that prints sheet media, according to an embodiment of the present disclosure.

FIG. 1B depicts an illustrative printer 200 including the transfix blanket 100, according to one or more embodiments disclosed. The printer 200 may be an indirect aqueous inkjet printer that forms an ink image on a surface of the blanket 100. The blanket 100 may be mounted about an intermediate rotating member 212. The ink image may be transferred from the blanket 100 to media passing through a nip 218 formed between the blanket 100 and a transfix roller 219.

A print cycle is now described with reference to the printer 200. A "print cycle" refers to operations of the printer 200 including, but not limited to, preparing an imaging surface for printing, ejecting ink onto the imaging surface, treating the ink on the imaging surface to stabilize and prepare the image for transfer to media, and transferring the image from the imaging surface to the media.

The printer 200 may include a frame 211 that supports operating subsystems and components, which are described below. The printer 200 may also include an intermediate transfer member, which is illustrated as a rotating imaging drum 212. The imaging drum 212 may have the blanket 100 mounted about the circumference of the drum 212. The blanket 100 may move in a direction 216 as the member 212 rotates. The transfix roller 219 may rotate in the direction 217 and be loaded against the surface of blanket 100 to form the transfix nip 218, within which ink images formed on the surface of blanket 100 are transfixed onto a print medium 249. In some embodiments, a heater in the drum 212 or in another location of the printer heats the blanket 100 to a temperature in a range of, for example, approximately 50° C. to approximately 70° C. The elevated temperature promotes partial drying of the liquid carrier that is used to deposit the hydrophilic composition and the water in the aqueous ink drops that are deposited on the blanket 100.

A surface maintenance unit ("SMU") 292 may remove residual ink left on the surface of the blanket 100 after the ink images are transferred to the print medium 249. The SMU 292 may include a coating applicator, such as a donor roller (not shown), which is partially submerged in a reservoir (not shown) that holds a hydrophilic polyurethane coating composition in a liquid carrier. The donor roller may rotate in response to the movement of the blanket 100 in the process direction. The donor roller may draw the liquid polyurethane composition from the reservoir and deposit a layer of the polyurethane composition on the blanket 100. As described below, the polyurethane composition may be deposited as a uniform layer having any desired thickness. After a drying process, the dried polyurethane coating may substantially cover a surface of the blanket 100 before the printer 200 ejects ink drops during a print process. The SMU 292 may be operatively connected to a controller 280, described in more detail below, to enable the controller 280 to operate the donor roller, as well as a metering blade and a cleaning blade to deposit and distribute the coating material onto the surface of the blanket 100 and to remove un-transferred ink and any polyurethane residue from the surface of the blanket 100.

The printer 200 may also include a dryer 296 that emits heat and optionally directs an air flow toward the polyurethane composition that is applied to the blanket 100. The dryer 296 may facilitate the evaporation of at least a portion of the liquid carrier from the polyurethane composition to leave a dried layer on the blanket 100 before the intermediate transfer member passes one or more printhead modules 234A-234D to receive the aqueous printed image.

The printer 200 may also include an optical sensor 294A, also known as an image-on-drum ("IOD") sensor, which is configured to detect light reflected from the blanket 100 and the polyurethane coating applied to the blanket 100 as the member 212 rotates past the sensor. The optical sensor 294A includes a linear array of individual optical detectors that are arranged in the cross-process direction across the blanket 100. The optical sensor 294A generates digital image data corresponding to light that is reflected from the blanket 100 and the polyurethane coating. The optical sensor 294A generates a series of rows of image data, which are referred to as "scanlines," as the intermediate transfer member 212 rotates the blanket 100 in the direction 216 past the optical sensor 294A. In at least one embodiment, each optical detector in the optical sensor 294A may include three sensing elements that are sensitive to wavelengths of light corresponding to red, green, and blue (RGB) reflected light colors. In another embodiment, the optical sensor 294A may include illumination sources that shine red, green, and blue light. In yet another embodiment, the sensor 294A may have an illumination source that shines white light onto the surface of blanket 100, and white light detectors are used.

The optical sensor 294A may shine complementary colors of light onto the image receiving surface to enable detection of different ink colors using the photodetectors. The image data generated by the optical sensor 294A may be analyzed by the controller 280 or other processor in the printer 200 to identify the thickness of the polyurethane coating on the blanket 100. The thickness and coverage may be identified from either specular or diffuse light reflection from the blanket 100 and/or the coating. Other optical sensors 294B, 294C, and 294D may be similarly configured and located in different locations around the blanket 100 to identify and evaluate other parameters in the printing process, such as missing or inoperative inkjets and ink image formation prior to image drying (294B), ink image treatment for image transfer (294C), and the efficiency of the ink image transfer (294D). Alternatively, some embodiments may include an optical sensor to generate additional data that may be used for evaluation of the image quality on the media (294E).

The printer 200 may include an airflow management system 201, which generates and controls a flow of air through the print zone. The airflow management system 201 may include a printhead air supply 202 and a printhead air return 203. The printhead air supply 202 and return 203 may be operatively connected to the controller 280 or some other processor in the printer 200 to enable the controller to manage the air flowing through the print zone. This regulation of the air flow may be through the print zone as a whole or about one or more printhead arrays. The regulation of the air flow may help to prevent evaporated solvents and water in the ink from condensing on the printhead and as well as attenuating heat in the print zone to reduce the likelihood that ink dries in the inkjets, which may clog the inkjets. The airflow management system 201 may also include one or more sensors to detect humidity and temperature in the print zone to enable more precise control of the temperature, flow, and humidity of the air supply 202 and return 203 to ensure optimum conditions within the print zone.

The printer 200 may also include an aqueous ink supply and delivery subsystem 220 that has at least one source 222 of one color of aqueous ink. Since the printer 200 is a multicolor image producing machine, the ink delivery system 220 includes, for example, four (4) sources 222, 224, 226, 228, representing four (4) different colors CYMK (cyan, yellow, magenta, black) of aqueous inks.

The printhead system 230 may include a printhead support 232, which provides support for a plurality of printhead modules, also known as print box units, 234A-234D. Each printhead module 234A-234D effectively extends across the width of the blanket 100 and ejects ink drops onto the blanket 100. A printhead module 234A-234D may include a single printhead or a plurality of printheads configured in a staggered arrangement. Each printhead module 234A-234D may be operatively connected to a frame (not shown) and aligned to eject the ink drops to form an ink image on the coating on the blanket 100. The printhead modules 234A-234D may include associated electronics, ink reservoirs, and ink conduits to supply ink to the one or more printheads. One or more conduits (not shown) may operatively connect the sources 222, 224, 226, and 228 to the printhead modules 234A-234D to provide a supply of ink to the one or more printheads in the modules 234A-234D. As is generally familiar, each of the one or more printheads in a printhead module 234A-234D may eject a single color of ink. In other embodiments, the printheads may be configured to eject two or more colors of ink. For example, printheads in modules 234A and 234B may eject cyan and magenta ink, while printheads in modules 234C and 234D may eject yellow and black ink. The printheads in the illustrated modules 234A-234D are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 200 includes four printhead modules 234A-234D, each of which has two arrays of printheads, alternative configurations include a different number of printhead modules or arrays within a module.

After the printed image on the blanket 100 exits the print zone, the image passes under an image dryer 204. The image dryer 204 may include a heater, such as a radiant infrared heater, a radiant near infrared heater, and/or a forced hot air convection heater 205. The image dryer 204 may also include a dryer 206, which is illustrated as a heated air source, and air returns 207A and 207B. The infrared heater 205 may apply infrared heat to the printed image on the surface of the blanket 100 to evaporate water or solvent in the ink. The heated air source 206 may direct heated air over the ink to supplement the evaporation of the water or solvent from the ink. In at least one embodiment, the dryer 206 may be a heated air source with the same design as the dryer 296. While the dryer 206 may be positioned along the process direction to dry the hydrophilic composition, the dryer 206 may also be positioned along the process direction after the printhead modules 234A-234D to at least partially dry the aqueous ink on the blanket 100. The air may then be collected and evacuated by air returns 207A and 207B to reduce the interference of the air flow with other components in the printing area.

The printer 200 may further include a print medium supply and handling system 240 that stores, for example, one or more stacks of paper print mediums of various sizes. The print medium supply and handling system 240, for example, includes sheet or substrate supply sources 242, 244, 246, and 248. The supply source 248 may be a high capacity paper supply or feeder for storing and supplying image receiving substrates in the form of cut print mediums 249. The print medium supply and handling system 240 may also include a substrate handling and transport system 250 that has a media pre-conditioner assembly 252 and a media post-conditioner assembly 254. The printer 200 may also include a fusing device 260 to apply additional heat and pressure to the print medium after the print medium passes through the transfix nip 218. The printer 200 may also include an original document feeder 270 that has a document holding tray 272, document sheet feeding and retrieval devices 274, and a document exposure and scanning system 276.

Operation and control of the various subsystems, components, and functions of the printer 200 may be performed with the aid of the controller 280. The controller 80 may be operably connected to the intermediate transfer member 212, the printhead modules 234A-234D (and thus the printheads), the substrate supply and handling system 240, the substrate handling and transport system 250, and, in some embodiments, the one or more optical sensors 294A-294E. The controller 280 may be a self-contained, dedicated minicomputer having a central processor unit ("CPU") 282 with electronic storage 284, and a display or user interface ("UI") 286. The controller 280 may include a sensor input and control circuit 288 as well as a pixel placement and control circuit 289. In addition, the CPU 282 may read, capture, prepare, and manage the image data flow between image input sources, such as the scanning system 276, or an online or a work station connection 290, and the printhead modules 234A-234D. As such, the controller 280 may be the main multi-tasking processor for operating and controlling all of the other machine subsystems and functions.

Once an image or images have been formed on the blanket 100 and coating under control of the controller 280, the printer 200 may operate components within the printer 200 to perform a process for transferring and fixing the image or images from the blanket 100 to media. The controller 280 may operate actuators to drive one or more of the rollers 264 in the media transport system 250 to move the print medium 249 in the process direction P to a position adjacent the transfix roller 219 and then through the transfix nip 218 between the transfix roller 219 and the blanket 100. The transfix roller 219 may apply pressure against the back side of the print medium 249 in order to press the front side of the print medium 249 against the blanket 100 and the intermediate transfer member 212. Although the transfix roller 219 may also be heated, as shown, the transfix roller 219 is unheated in FIG. 1B. The pre-heater assembly 252 for the print medium 249 may be in the media path leading to the transfix nip 218. The pre-conditioner assembly 252 may condition the print medium 249 to a predetermined temperature that aids in the transferring of the image to the media, thus simplifying the design of the transfix roller 219. The pressure produced by the transfix roller 219 on the back side of the heated print medium 249 may facilitate the transfixing (transfer and fusing) of the image from the intermediate transfer member 212 onto the print medium 249. The rotation or rolling of both the intermediate transfer member 212 and transfix roller 219 not only transfixes the images onto the print medium 249, but also assists in transporting the print medium 249 through the transfix nip 218. The intermediate transfer member 212 may continue to rotate to enable the printing process to be repeated.

After the intermediate transfer member moves through the transfix nip 218, the image receiving surface passes a cleaning unit that removes, among other things, residual ink from the image receiving surface of the blanket 100. In the printer 200, the cleaning unit is embodied as a cleaning blade 295 that engages the surface of the blanket 100. The blade 295 is formed from a material that wipes the surface of the blanket 100 without causing damage to the blanket 100. For example, the cleaning blade 295 may be formed from a flexible polymer material in the printer 200. In another embodiment, the cleaning unit may include a roller or other member that applies a mixture of water and detergent to remove residual materials from the surface of the blanket 100 after the intermediate transfer member moves through the transfix nip 218. The term "detergent" or cleaning agent refers to any surfactant, solvent, or other chemical compound that is suitable for removing any residual ink from the image receiving surface of the blanket 100.

The topcoat layer 140 of blanket 100 may be a cured composition that includes a product of a grafting reaction between a fluoroelastomer and at least one of an aminosilane component and an aminofunctionalized fluorosilicone (EF) component. The fluoroelastomer, aminosilane component and the aminofunctionalized fluorosilicone component can be commercially available fluoroelastomer, aminosilane and aminofunctionalized fluorosilicone. The aminosilane component may be present in an amount relative to the fluoroelastomer of about 2 pph to about 10 pph. The aminofunctionalized fluorosilicone component may be present in an amount relative to the fluoroelastomer of about 2 pph to about 10 pph.

A "fluoroelastomer" is a fluorocarbon-derivative, a synthetic rubber. The term fluoroelastomer is well understood in the art. A fluoroelastomer or fluoro rubber of the polymethylene type uses vinylidene fluoride as a comonomer and has substituent fluoro, alkyl, perfluoroalkyl, or perfuoroalkoxy groups on the polymer chain. Fluorelastomers are categorized under the ASTM D1418, and have the ISO 1629 designation FKM. This class of elastomer is a family comprising copolymers that contains monomers exclusively selected from the group consisting of hexafluoropropylene (HFP), tetrafluoroethylene (TFE), vinylidene fluoride (VDF), perfluoromethyl vinyl ether (PMVE), and ethylene (ET). The term copolymer here refers to polymers made from two or more monomers. Fluoroelastomers may contain two or three of these monomers, and have a fluorine content of from about 60 wt % to about 70 wt %. Fluoroelastomers generally have superior chemical resistance and good physical properties. Exemplary fluoroelastomers are available under the TECNOFLON brand P959 from Solvay America, Inc. (Houston, Tex.) or as a VDF-TFE-HFP terpolymer under the DAI-EL brand G621 from Daikin Industries (Houston, Tex.).

The aminosilane in the composition described above can be any aminosilane-containing compound that can be reacted with the fluoroelastomer. For example, an exemplary aminosilane is an oxyaminosilane. The term "oxyaminosilane" refers to a compound that has at least one silicon atom covalently bonded to an oxygen atom and that has at least one amino group (—$NH_2$). The oxygen atom may be part of a hydrolyzable group, such as an alkoxy or hydroxyl group. The amino group is not necessarily covalently bonded to the silicon atom, but may be joined through a linking group. A general formula for an oxyaminosilane is provided in Formula (1):

$$Si(OR)_p R'_q (\text{-L-NH}_2)_{4-p-q} \quad (1),$$

where R is hydrogen or alkyl, p is an integer from 1 to 3, R' is an alkyl, q is an integer from 0 to 2, L is a linking group, and 4-p-q must be at least 1. In an example, p is 2 or 3.

The term "alkyl" as used herein refers to a group composed entirely of carbon atoms and hydrogen atoms that is fully saturated. The alkyl group may include a chain that is linear, branched, or cyclic. For example, linear alkyl radicals generally have the formula —$C_nH_{2n+1}$, where n is an integer.

The term "alkoxy" may refer to an alkyl group singular bonded to an oxygen atom.

The term "amino" refers to a group containing a nitrogen atom attached by a single bond to hydrogen atoms, alkyl groups, aryl groups or a combination thereof. An "amine" is an organic compound that contains an amino group. Amines are derivatives of the inorganic compound ammonia.

Exemplary oxyaminosilanes include [3-(2-aminoethylamino)propyl] trimethoxysilane, as well as 3-aminopropyl trimethoxysilane. In 3-aminopropyl trimethoxysilane, the propyl chain is the linking group. The aminosilane may be a commercially available aminosilane such as N-aminoethyl-2-aminopropyl trimethoxysilane from Sigma-Aldrich or UCT (sold as AO700). The amine functional group may be a primary, secondary, or tertiary amine. The nitrogen atom of an amino group can bond with the fluoroelastomer (i.e the oxygen atom will not bond with the fluoroelastomer).

Exemplary aminofunctionalized fluorosilicones (EF) can include amino-functionalized alkoxy-terminated fluorosilicones such as EF0712128 provided by Wacker Chemie AG (Munich, Germany) and can be represented by the structure in formula (2):

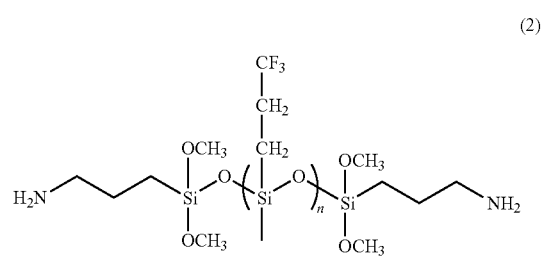

(2)

A method for forming the topcoat layer 140 can include forming a composition, such as a composition comprising the product of a grafting reaction between a fluoroelastomer and at least one of an aminosilane crosslinker and an aminofunctionalized fluorosilicone crosslinker. as described above, on a surface of the blanket. The method can include curing the composition at a first curing temperature in the range of a temperature lower than about 218° C., for example a temperature of about 23° C. for a first curing time, and/or curing the composition at a second curing temperature that can be greater than the first curing temperature, for example a second temperature in the range of lower than about 218° C., such as a second temperature of about 140° C.

The compositions comprising the product of a grafting reaction between a fluoroelastomer and at least one of an aminosilane crosslinker and an amino-functionalized fluorosilicone crosslinker as described herein may be formed by way of the reaction mechanisms shown in FIGS. 2A-2D and FIGS. 3A-3G.

Figure 2A:
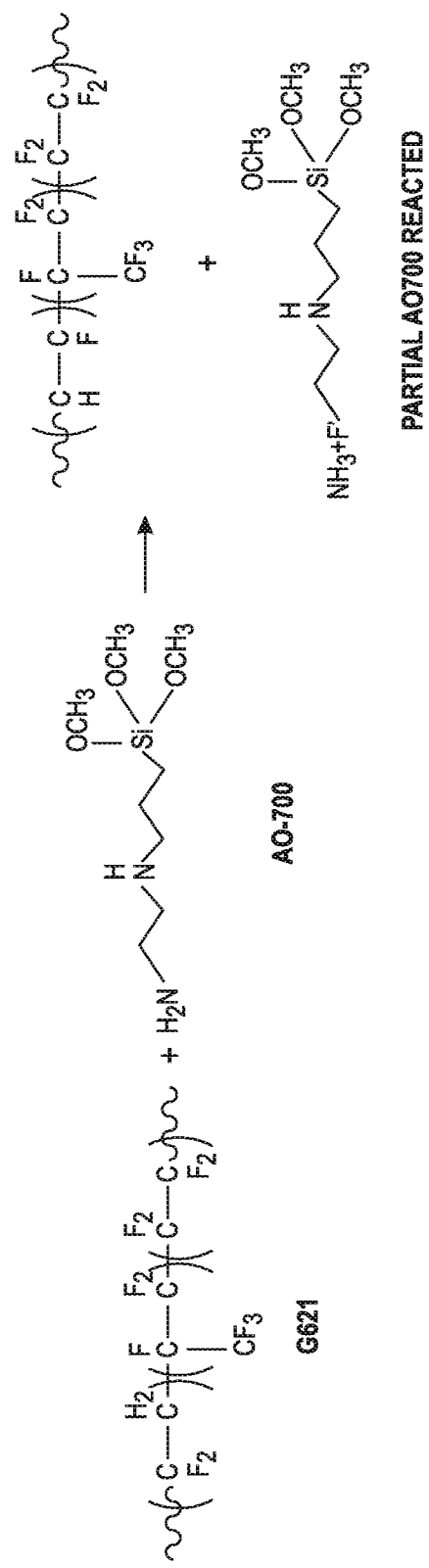
FIG. 2A shows a synthesis mechanism for forming a fluoroelastomer in accordance with an embodiment (dehydrofluorination)
Figure 2B:
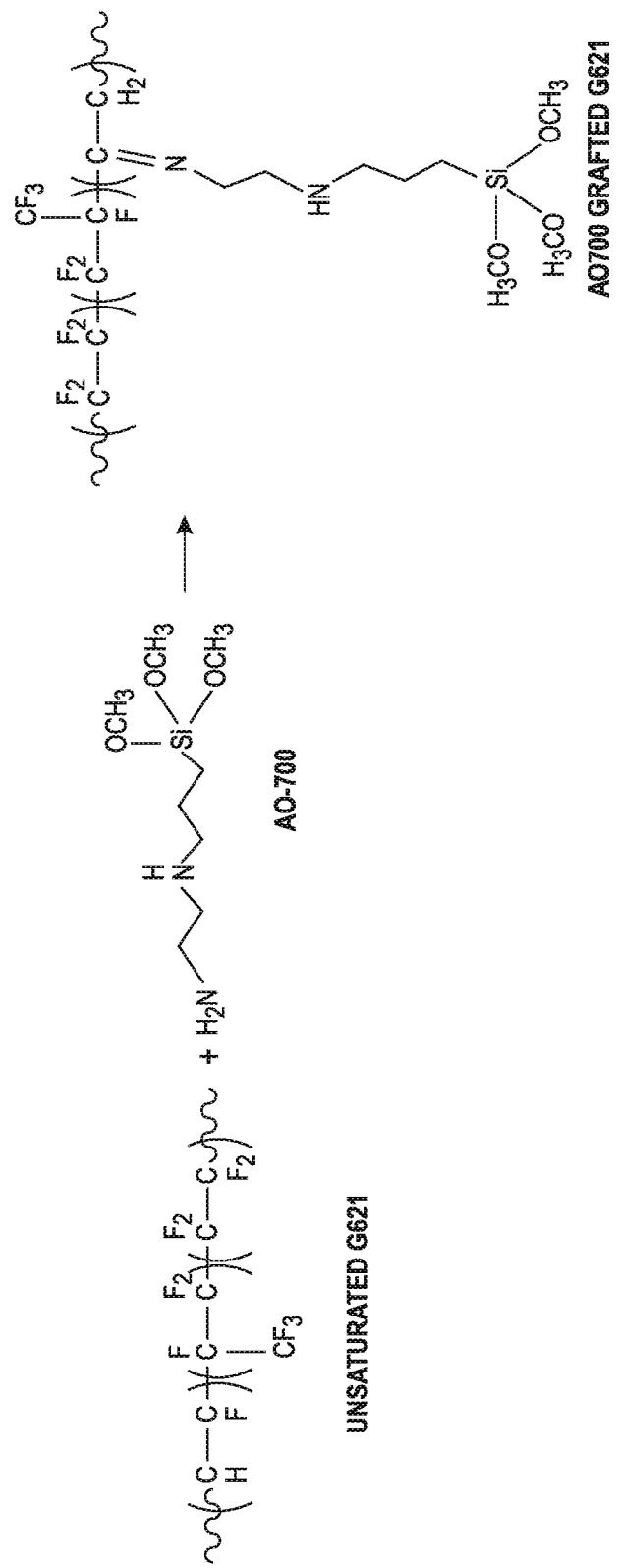
FIG. 2B shows a synthesis mechanism for forming a fluoroelastomer in accordance with an embodiment (addition of amine across the double bond)
Figure 2C:
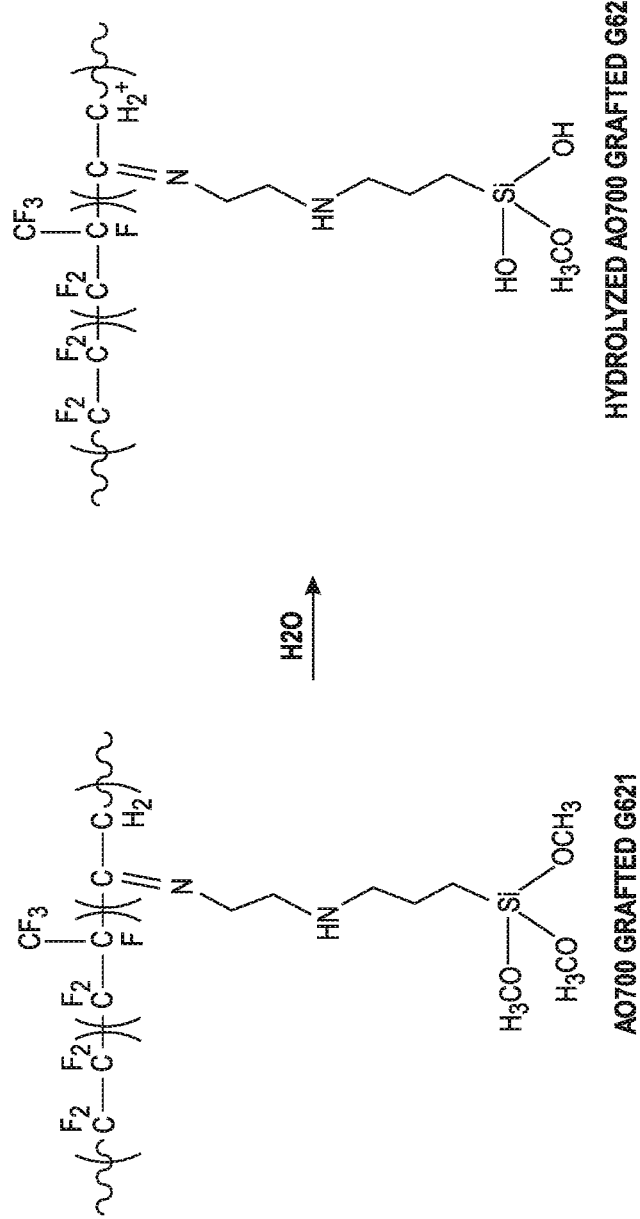
FIG. 2C shows a synthesis mechanism for forming a fluoroelastomer in accordance with an embodiment (hydrolysis)
Figure 2D:
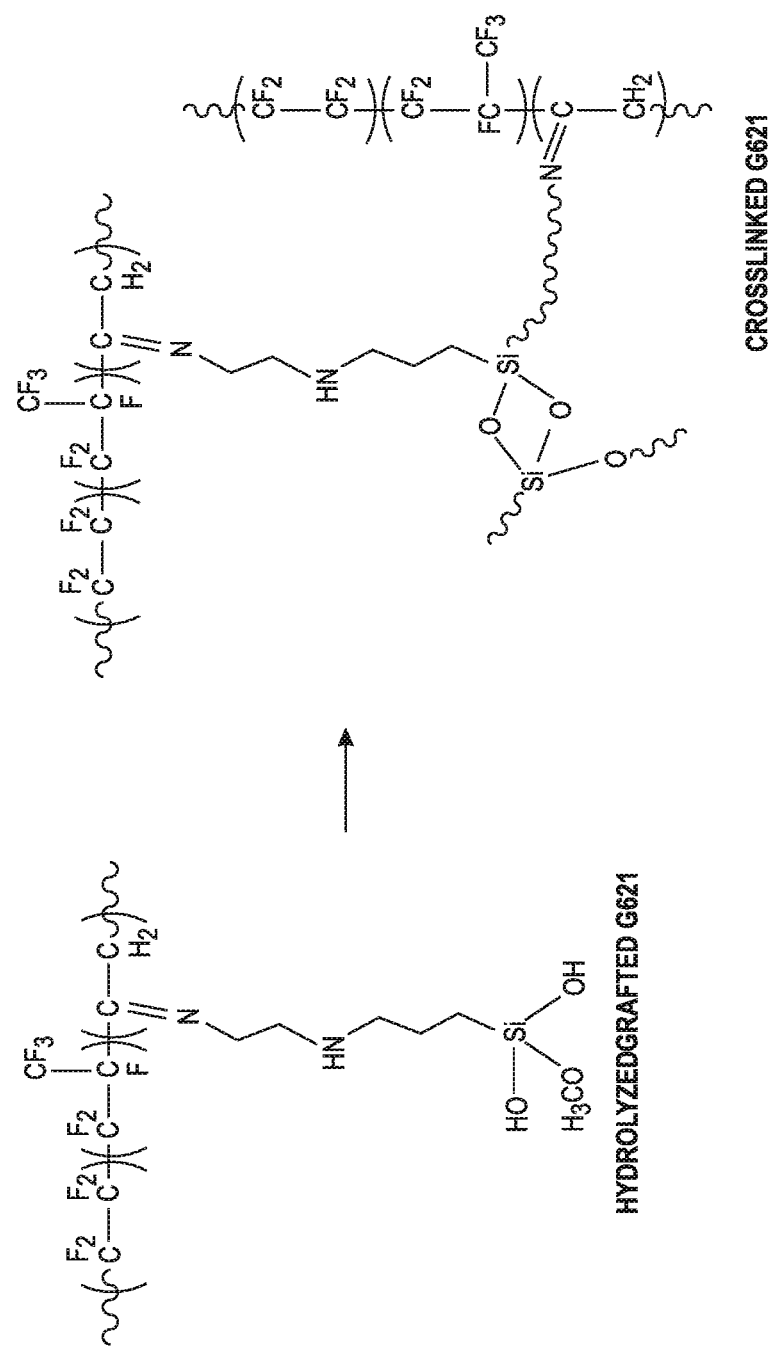
FIG. 2D shows a synthesis mechanism for forming a fluoroelastomer in accordance with an embodiment (condensation and addition of amine across unsaturated fluoroelastomer)

The scheme illustrated by FIGS. 2A-2D shows reaction mechanism for forming a graft between an FKM fluoroelastomer, for example, DAI-EL G621, and an aminosilane agent, such as AO700 aminosilane agent N-aminoethyl-2-aminopropyl trimethoxysilane as the crosslinker grafting component. FIG. 2A shows a first step of a dehydrofluorination in which a fluoroelastomer, for example, DAI-EL G621, is caused to react with aminosilane, for example, AO700, resulting in a carbon-carbon double bond in G621 (upon loss of a fluoride ion) and a partially reacted AO700. Step 2, shown in FIG. 2B, includes a step of adding an amine, for example the terminal amine in AO700, across the double bond in the unsaturated G621 formed in step 1 to yield a product of a grafting reaction, that is, an aminosilane (AO700) grafted G621 composition. Then, in a third step shown in FIG. 2C, the AO700 grafted G621 composition formed in step 2 undergoes a hydrolysis reaction to form a hydrolyzed AO700 grafted G621 composition. Finally, a fourth condensation step shown in FIG. 2D shows the hydrolyzed AO700 grafted G621 undergoing a crosslinking reaction.

Figure 3A:
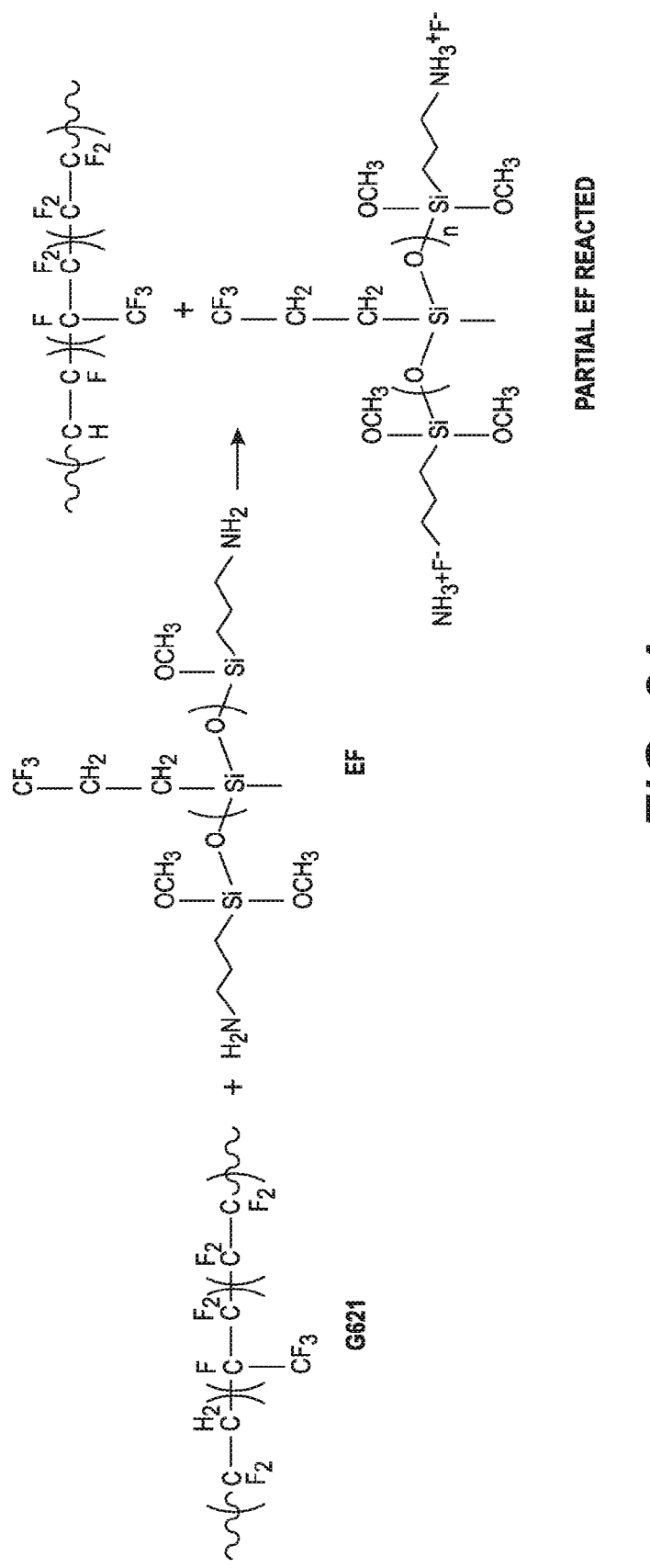
FIGS. 3A-3B show synthesis mechanisms for forming a fluoroelastomer in accordance with an embodiment (dehydrofluorination)
Figure 3B:
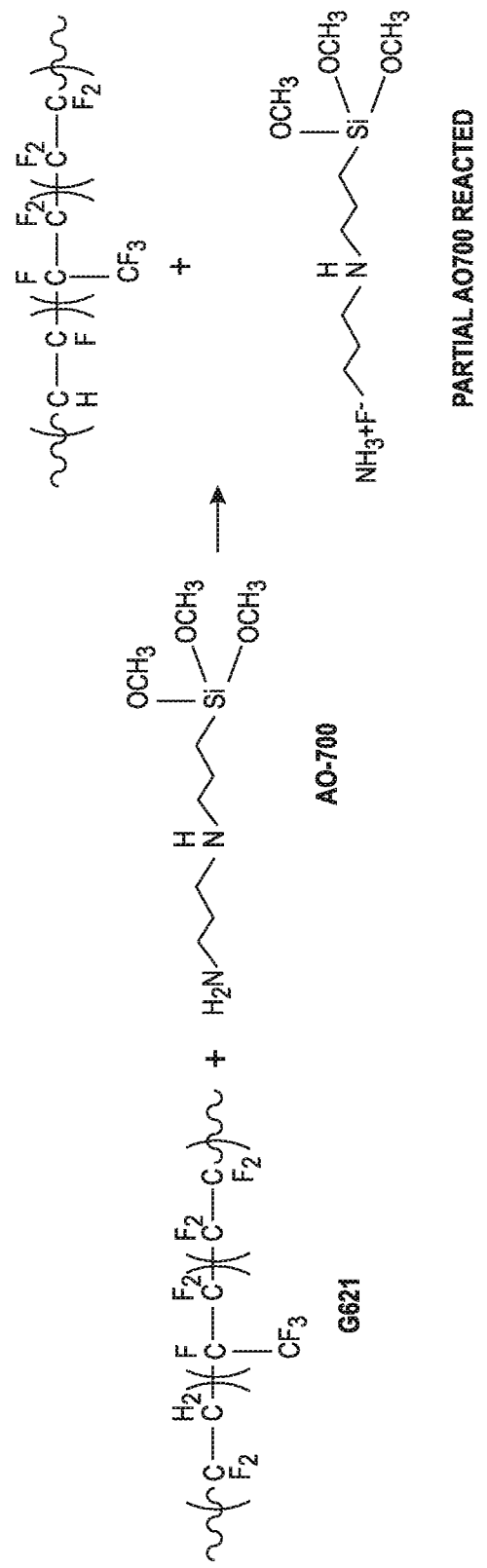
Figure 3C:
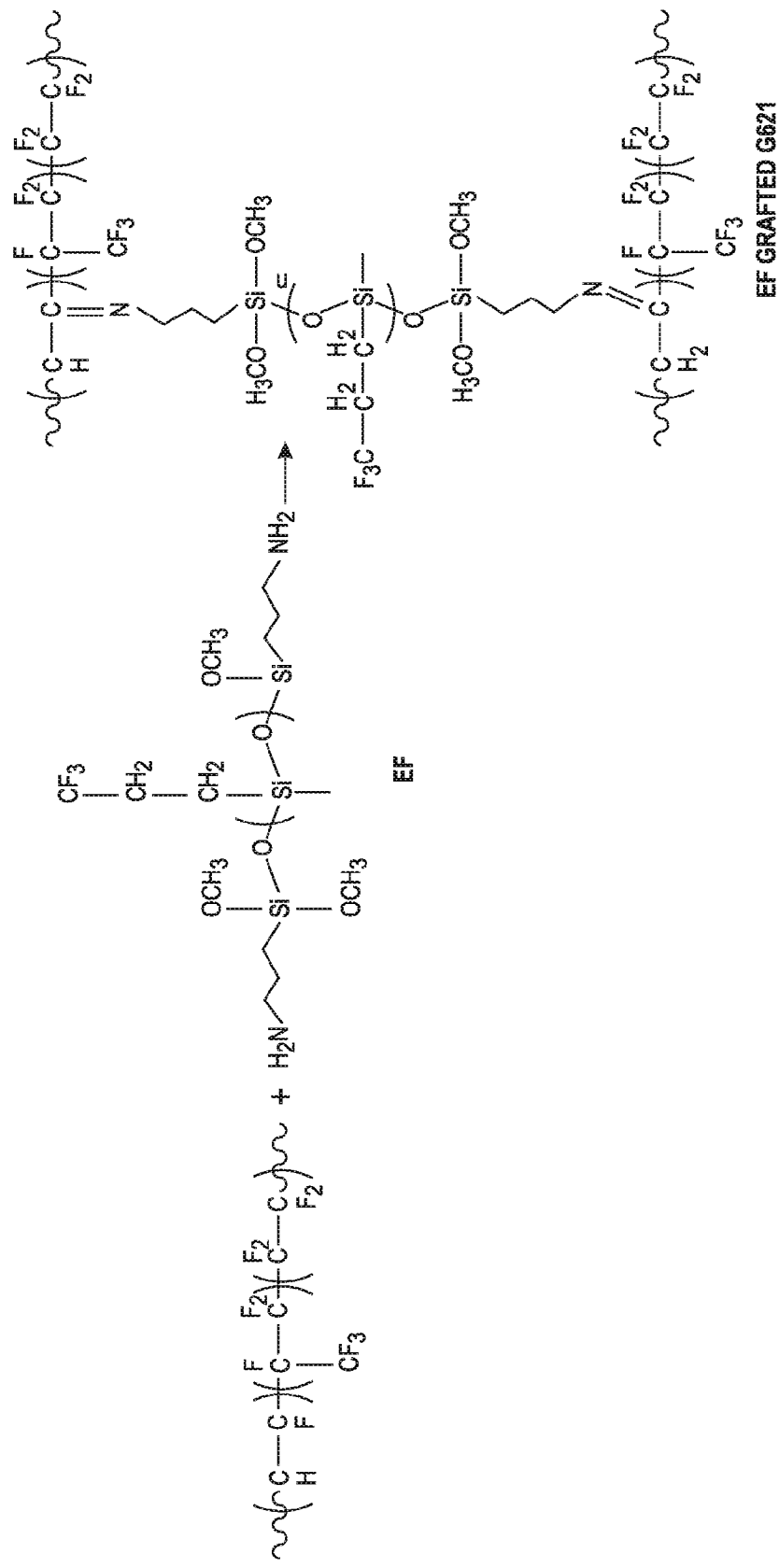
FIG. 3C-D show synthesis mechanisms for forming a fluoroelastomer in accordance with an embodiment (addition of amine across the double bond)
Figure 3D:
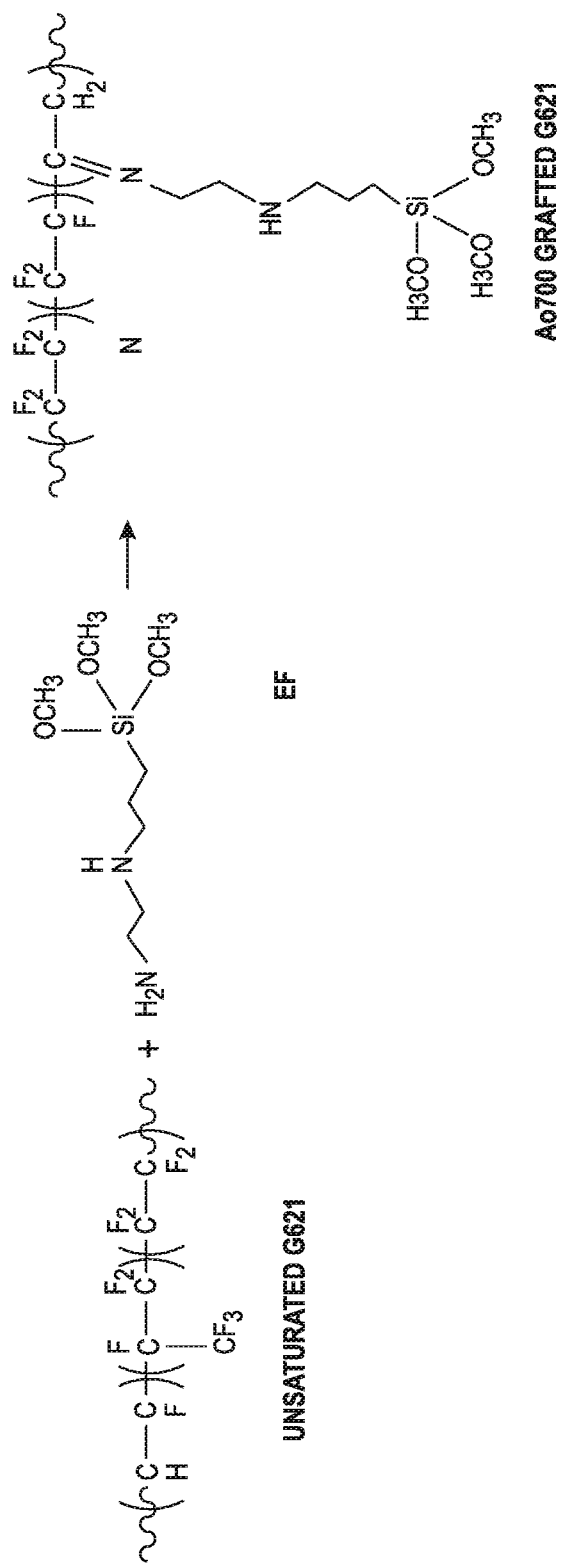
Figure 3E:
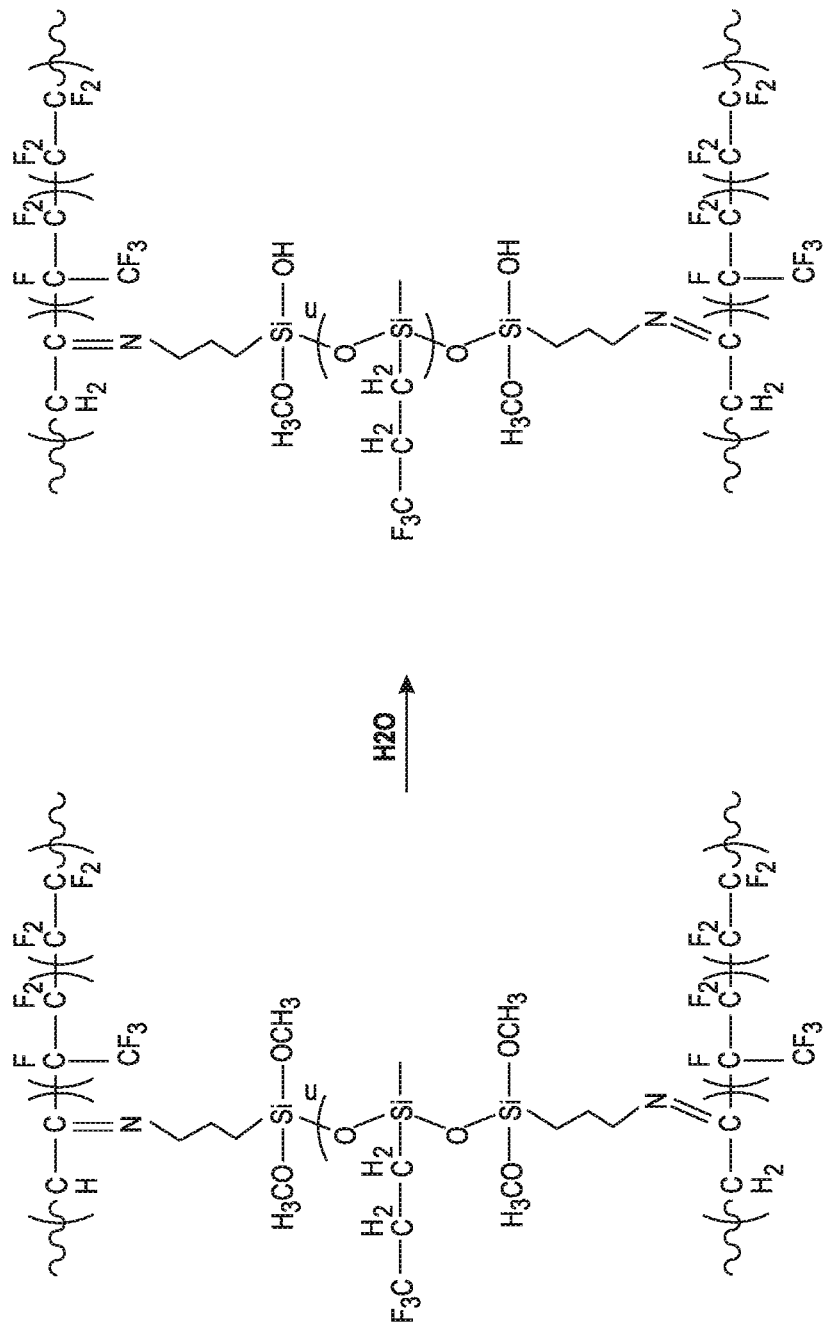
FIG. 3E-3F show synthesis mechanisms for forming a fluoroelastomer in accordance with an embodiment (hydrolysis)
Figure 3F:
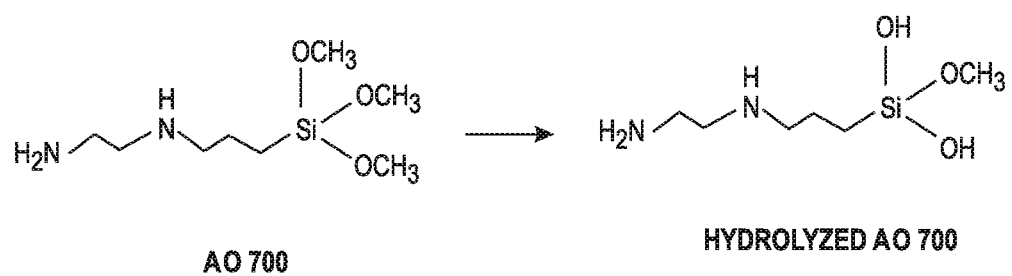
Figure 3G:
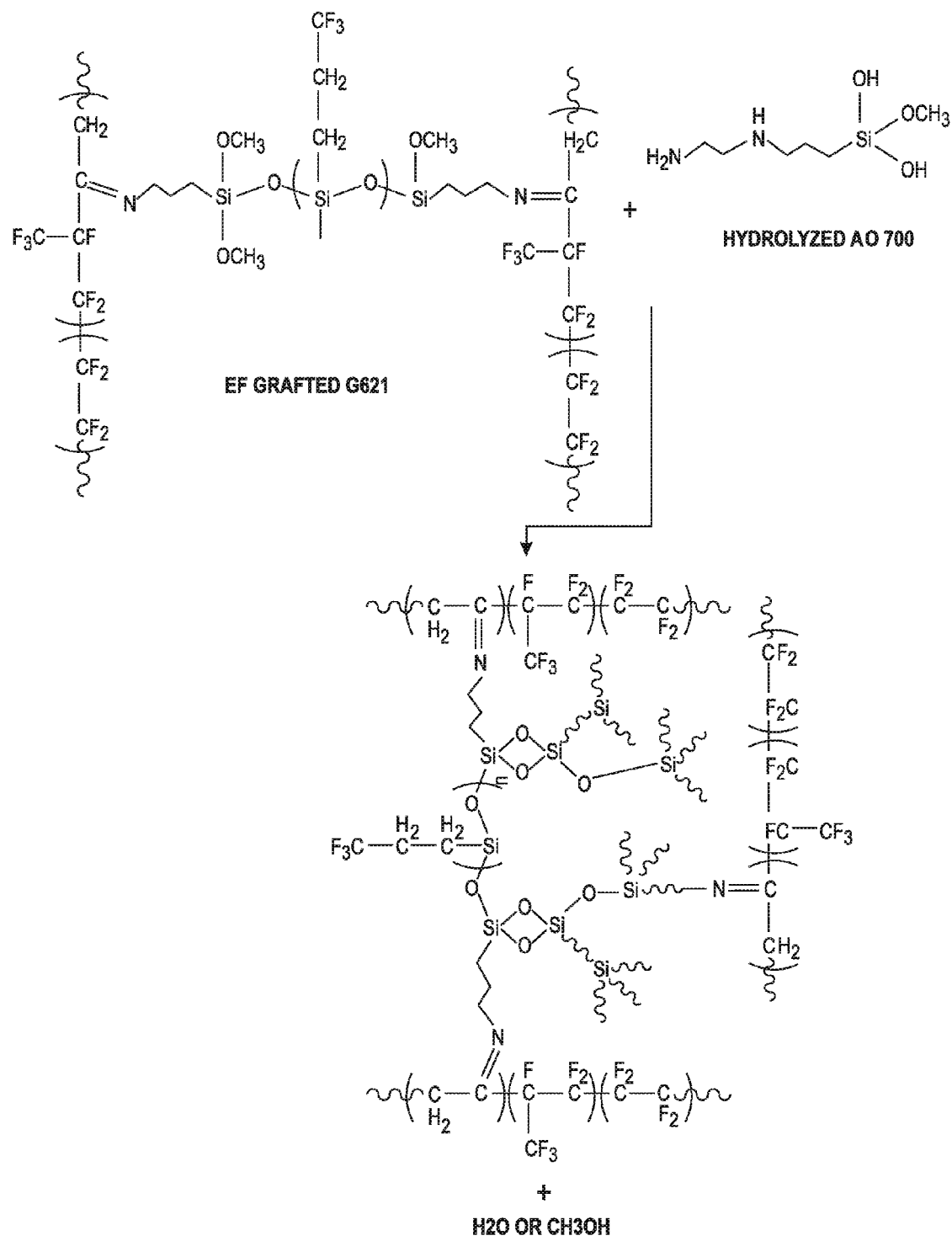
FIG. 3G shows a synthesis mechanism for forming a fluoroelastomer in accordance with an embodiment (condensation of hydrolyzed aminosilane agent onto an aminofunctionalized fluorosilicone-grafted fluoroelastomer)

Meanwhile, the scheme illustrated by FIGS. 3A-3D shows reaction mechanism for forming a graft between an FKM fluoroelastomer, for example, DAI-EL G621, and an amino-functionalized alkoxy terminated fluorosilicone (EF) and aminosilane agent, such as AO700 aminosilane agent N-aminoethyl-2-aminopropyl trimethoxysilane, as cross-linkers. In particular, FIG. 3A and FIG. 3B show a first step including parallel dehydrofluorination reactions in which G621 is caused to react with EF in a first reaction, and another G621 is caused to react with AO700 in a second reaction resulting in a carbon-carbon double bond in each G621 (i.e., unsaturated G621) (upon loss of a fluoride ion), and partially reacted EF and partially reacted AO700. Step 2 shown in FIGS. 3C-3D includes adding an amine, for example the terminal amine in EF, across the double bond in the unsaturated G621 formed in step 1 to yield a product of a grafting reaction, that is, an EF grafted G621 composition (FIG. 3C), and a parallel step of adding an amine, for example the terminal amine in AO700, across the double bond in the unsaturated G621 formed in step 1 to yield a product of a grafting reaction, that is, an aminosilane (AO700) grafted G621 composition (FIG. 3D). Then, in a third step shown in FIGS. 3E-3F, the EF grafted G621 composition formed in step 2 undergoes a hydrolysis reaction to form a hydrolyzed EF grafted G621 composition (FIG. 3E), and in parallel, AO-700 undergoes a hydrolysis reaction to form a hydrolyzed AO-700 (FIG. 3F). Finally, a fourth step illustrated in FIG. 3G shows condensation of hydrolyzed AO700 formed in step 3 onto the EF grafted G621 formed in step 2.

Figure 4A:
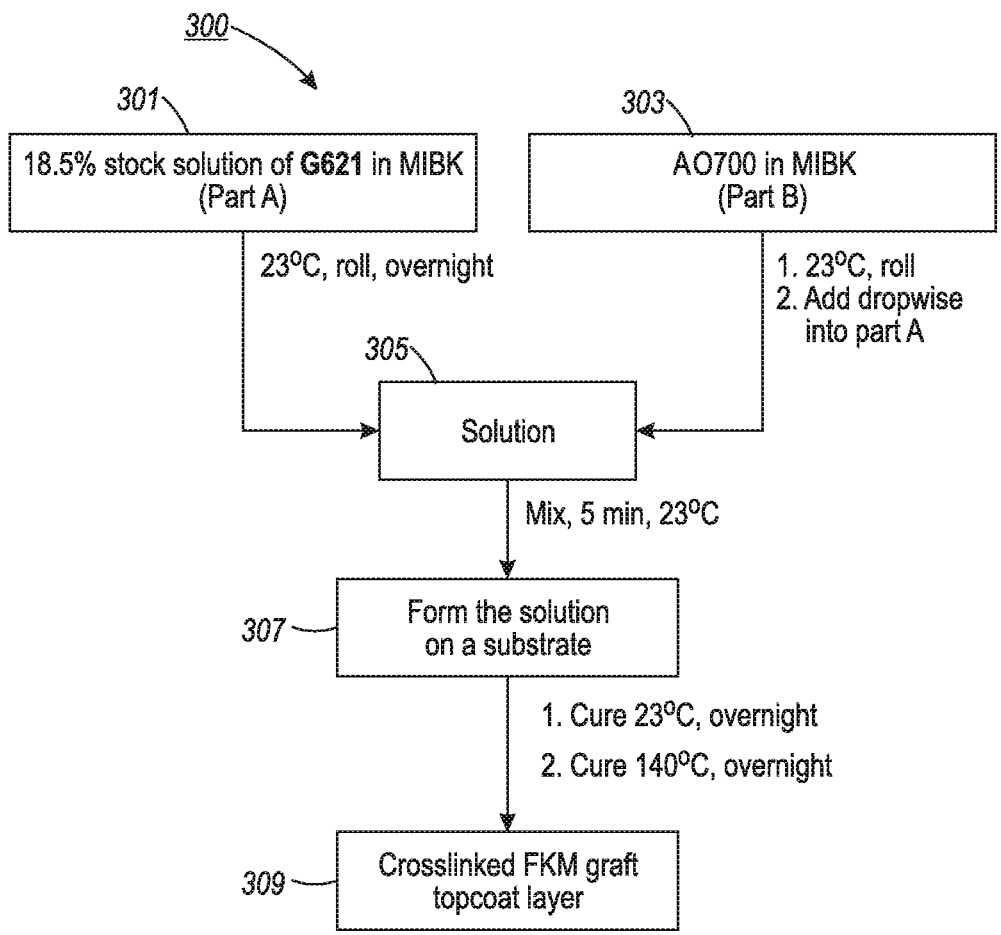
FIG. 4A is a flowchart of a process for forming a fluoroelastomer and topcoat in accordance with an embodiment.

FIG. 4A shows a process 300 for forming AO700-grafted polymer from G621, in accordance with the synthesis mechanism shown in FIGS. 2A-2D. In particular, FIG. 4A shows a process 300 for manufacturing a grafted fluoroelastomer including preparing an 18.5% solution of G621 in methyl isobutyl ketone (MIBK) (Part A) at 301, and preparing a solution of AO700 and MIBK (Part B) at 303. Part A may consist of a very low amount of surfactant that provides good compatibility between G621 and the release layer/oil applied on, for example, a fuser, while preventing pin holes/fish eye-type image quality defects. Part B can be prepared with a ratio of AO700:MIBK of about 1:4 mol/mol. Each of Part A and Part B are independently outgassed at 23° C. overnight and allowed to roll in order to reduce any air bubble formation. Part B is then added dropwise into Part A to form a solution comprising Part A and Part B.

FIG. 4A shows that at 305 the solution comprising Part A and Part B is mixed for 5 minutes at 23° C. At 307, the mixture is formed on a substrate, for example, poured on the substrate, outgases (solvent evaporation) and cures at 23° C. overnight. At 309, the solidified material film is cured overnight at 140° C. The resulting composition is a crosslinked FKM graft, such as a crosslinked FKM graft topcoat layer.

By way of example, a solution in accordance with Part A and a solution in accordance with Part B in FIG. 4A were prepared, rolled overnight at 23° C. for about 16 to about 18 hours. Part B was added into Part A dropwise. Once the addition of Part B to Part A was done, the resulting solution was poured into molds (6×6 inch) and kept at room temperature overnight and then transferred to the oven which was kept at 140° C. for 24 hours. The same solution was also flow coated on a Trelleborg substrate for evaluation as a blanket material in an aqueous transfix print process.

Figure 4B:
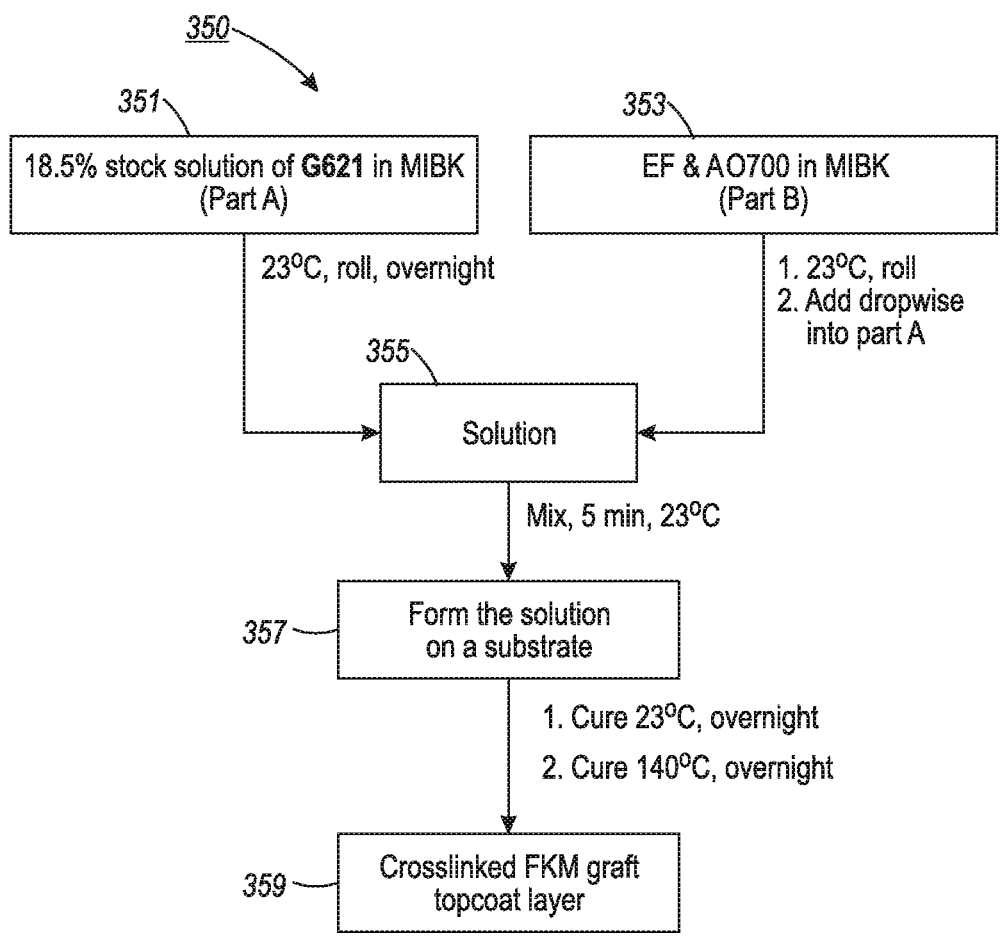
FIG. 4B is a flowchart of a process for forming a fluoroelastomer and topcoat in accordance with an embodiment.

FIG. 4B shows a process 350 for forming AO700-grafted polymer from G621, in accordance with the synthesis mechanism shown in FIGS. 3A-3D. In particular, FIG. 4B shows a process 350 for manufacturing a grafted fluoroelastomer including preparing a 18.5% solution of G621 in methyl isobutyl ketone (MIBK) (Part A) at 351, and a solution of EF & AO700 in MIBK (Part B) at 353. Part A may consist of a very low amount of surfactant that provides good compatibility between G621 and the release layer/oil applied on, for example, a fuser, while preventing pin holes/fish eye-type image quality defects. Part B can be prepared with a ratio of aminosilane to solvent, for example a ratio for AO700:MIBK, of about 1:4 mol/mol. Part B can be prepared with a ratio for aminosilane component to aminofunctionalized fluorosilicone component, for example a ratio for AO700:EF, in the range of about 0.5:1 mol/mol to about 3:1 mol/mol, or about 1:1 mol/mol to about 2:1 mol/mol. Each of Part A and Part B are independently outgassed at 23° C. overnight and allowed to roll in order to reduce any air bubble formation. Part B is then added dropwise into Part A to form a solution comprising Part A and Part B.

FIG. 4B shows that at 355 the solution comprising Part A and Part B is mixed for 5 minutes at 23° C. At 357, the mixture is formed on a substrate, for example, poured on the substrate, outgases (solvent evaporation) and cures at 23° C. overnight. At 359, the solidified material film is cured overnight at 140° C. The resulting composition is a crosslinked FKM graft, such as a crosslinked FKM graft topcoat layer.

By way of example, a solution in accordance with Part A and a solution in accordance with Part B in FIG. 4B were prepared, rolled overnight at 23° C. for about 16 to about 18 hours. Part B was added into Part A dropwise. Once the addition of Part B to Part A was done, the resulting solution was poured into molds (6×6 inch) and kept at room temperature overnight and then transferred to the oven which was kept at 140° C. for 24 hours. The same solution was also flow coated on a Trelleborg substrate for evaluation as a blanket material in an aqueous transfix print process.

Fluoroelastomer compositions in accordance with embodiments and methods of manufacturing are useful for other applications, including printing applications other than the indirect aqueous transfix printing systems described above. For example, such fluoroelastomer compositions can be used as surface top-coat materials for the reimageable surface of an imaging member in a variable data lithography system such as that disclosed in U.S. patent application Ser. No. 13/095,714 ("714 Application"), titled "Variable Data Lithography System," filed on Apr. 27, 2011 by Stowe et al., the disclosure of which is hereby incorporated by reference herein in its entirety.

The resulting grafted polymers were compared with related art compositions. In particular, the mechanical properties of G621-AO700-EF and G621-AO700 were evaluated for comparison. The results are shown in Table 1.

TABLE 1

| Film ID | Stress at Break (psi) | Strain at Break (%) | Toughness (in.-lbs./in.³) | Initial Modulus (psi) | Gelation time (hr) | Extractables (%) | Curing Temperature (° C.) |
|---|---|---|---|---|---|---|---|
| #1- G621(18.5%)/2 pph EF + 8 pphAO700/no filler | 1074 (961-1207) | 237 (215-256) | 1308 (1192-1533) | 854 (806-914) | 3.5 | 3.0 | 140 |
| #3 - G621(18.5%)/10 pph AO700/no filler | 1163 (1009-1263) | 231 (225-239) | 1393 (1208-1496) | 1091 (998-1169) | 2.5 | 3.2 | 140 |
| #8- G621(18.5%)/8 pph AO700 + 2 pph EF/no filler | 570 (513-641) | 56 (54-60) | 172 (155-197) | 1948 (1917-1985) | 3.5 | 4.9 | 218 |
| #9- G621(18.5%)/10 pph AO700/no filler | 1253 (1119-1406) | 84 (74-95) | 498 (406-610) | 1751 (1651-1832) | 2.5 | 5.2 | 218 |
| G621(18.5%)/10 pph EF/no filler | — | — | — | — | 24 | 10.8 | 140 |
| production fuser roll material | 1093.5 | 165 | 764.5 | 1597.5 | N/A | N/A | 218 |

Table 1 shows that the mechanical properties of stress, strain and toughness are comparable to conventional fuser roll material, which is indicative of a long life time. Also shown is that the mechanical properties degrade upon high temperature curing. Accordingly, AO700 grafting is suitable for curing at lower temperature. Additionally, the geleation time results show that the gelation time (i.e., the time for a viscosity change from 200 to 400 cp) is elongated from about 2.5 hours to about 3.5 hours. Accordingly, because filtration, degassing and other processes require more time during flow coating, the elongated gelation time indicates wide latitude for flow coating the compositions described herein. It is also noted that the results for extractables provides an indication of curing and mechanical properties. As shown in Table 1, the lower extractable values correspond to better mechanical properties. It is noted that G621 with 100% EF resulted in poor values for extractables and bad film appearance, and thus there was no need to test the mechanical properties as reflected in Table 1. Last, it is noted that curing temperature results show that the curing temperature is decreased from 218° C. in some instances to a value below 218° C., such as 140° C.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A polymer coating composition for a surface layer, comprising:
    a product of a grafting reaction between a fluoroelastomer and at least one of an aminosilane component and an aminofunctionalized fluorosilicone component,
    wherein the aminosilane component is present in an amount relative to an amount of the fluoroelastomer of about 2 pph to about 10 pph, and
    wherein the aminofunctionalized fluorosilicone component is present in an amount relative to an amount of the fluoroelastomer of about 2 pph to about 10 pph.

2. The composition of claim 1, wherein the reaction product is crosslinked.

3. The composition of claim 1, wherein the aminosilane component comprises an oxyaminosilane.

4. The composition of claim 3, wherein the oxyaminosilane is represented by formula (1):

$$\text{Si}(\text{OR})_p \text{R}'_q(\text{-L-NH}_2)_{4-p-q} \tag{1}$$

where R is hydrogen or alkyl, p is an integer from 1 to 3, R' is an alkyl, q is an integer from 0 to 2, L is a linking group, and 4-p-q is at least 1.

5. The composition of claim 1, wherein the aminofunctionalized fluorosilicone component comprises an aminofunctionalized alkoxy-terminated fluorosilicone.

6. The composition of claim 5, wherein the aminofunctionalized alkoxy-terminated fluorosilicone is represented by formula (2):

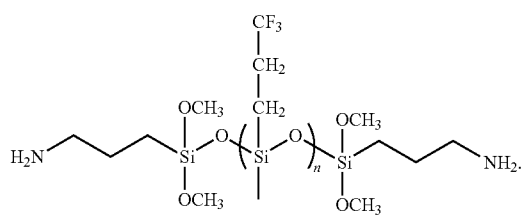

(2)

7. A printing system comprising:
an imaging member comprising a substrate and a surface layer disposed on the substrate, wherein the surface layer comprises a cured product of a grafting reaction between a fluoroelastomer and at least one of an aminosilane component and an aminofunctionalized fluorosilicone component, wherein the aminosilane component is present in an amount relative to an amount of the fluoroelastomer of about 2 pph to about 10 pph, and wherein the aminofunctionalized fluorosilicone component is present in an amount relative to an amount of the fluoroelastomer of about 2 pph to about 10 pph.

8. The printing system of claim 7, wherein a the surface layer is a topcoat of a fuser subsystem.

9. The printing system of claim 7, wherein the surface layer is a topcoat of blanket for an aqueous transfix printing system.

10. The printing system of claim 7, wherein the surface layer is a reimageable surface layer of a digital printing system.

* * * * *